US010269466B2

(12) United States Patent
Ansari (10) Patent No.: US 10,269,466 B2
(45) Date of Patent: Apr. 23, 2019

(54) HIGH EFFICIENCY BUS BAR FOR USE IN CONDUCTING AN ALTERNATING CURRENT AND METHOD FOR MANUFACTURING SAME (71) Applicant: Lear Corporation, Southfield, MI (US)

(72) Inventor: Ajmal Imran Ansari, Canton, MI (US)

(73) Assignee: Lear Corporation, Southfield, MI (US)

(*) Notice: Subject to any disclaimer, the term of this patent is extended or adjusted under 35 U.S.C. 154(b) by 182 days.

(21) Appl. No.: 15/156,456

(22) Filed: May 17, 2016

(65) Prior Publication Data
US 2017/0338002 A1    Nov. 23, 2017

(51) Int. Cl.
H01B 5/02       (2006.01)
H02B 1/20       (2006.01)
B60L 11/00      (2006.01)
H01M 2/20       (2006.01)
H01R 13/02      (2006.01)
H01B 13/00      (2006.01)
H01R 43/16      (2006.01)
H02G 5/10       (2006.01)
H01R 11/28      (2006.01)

(52) U.S. Cl.
CPC ............ H01B 5/02 (2013.01); B60L 11/00 (2013.01); H01B 13/0036 (2013.01); H01M 2/206 (2013.01); H01R 13/02 (2013.01); H01R 43/16 (2013.01); H02B 1/20 (2013.01); H02G 5/10 (2013.01); H01R 11/288 (2013.01)

(58) Field of Classification Search
None
See application file for complete search history.

(56) References Cited

U.S. PATENT DOCUMENTS

| | | | | |
|---|---|---|---|---|
| 2,297,170 A * | 9/1942 | Rudd | ................ | H02G 5/02 174/99 B |
| 2,997,627 A * | 8/1961 | Ellegood | ............. | H02B 1/21 174/88 B |
| 3,213,183 A * | 10/1965 | Weimer | ............ | H02G 5/06 174/33 |
| 5,393,934 A | 2/1995 | Mori et al. | | |
| 5,821,464 A * | 10/1998 | Graham | ............ | H02G 5/007 174/86 |
| 6,024,589 A * | 2/2000 | Hahn, IV | .......... | H05K 1/148 174/71 B |
| 6,244,876 B1 | 6/2001 | Saka | | |
| 6,506,068 B2 * | 1/2003 | Wagener | ............ | H02G 5/00 174/88 B |
| 7,198,524 B2 | 4/2007 | Tsugane et al. | | |

(Continued)

Primary Examiner — Dimary S Lopez Cruz
(74) Attorney, Agent, or Firm — Brooks Kushman P.C.

(57) ABSTRACT

A bus bar for use in conducting an alternating current may comprise multiple substantially parallel ribs and an electrically conductive attachment feature. Each rib may include a first and second end. Each rib may be provided for conducting a substantially equal portion of the current. The ribs may be spaced apart to provide gaps therebetween for airflow through the gaps. The electrically conductive attachment feature may connect the first ends of the plurality of ribs, and may be provided for attaching the plurality of ribs to an electrical component. An electrically insulating spacer may be located between at least two of the ribs, contacting and providing physical support to those ribs.

15 Claims, 5 Drawing Sheets (56) References Cited

U.S. PATENT DOCUMENTS

| | | | | |
|---|---|---|---|---|
| 7,704,083 B1* | 4/2010 | Cheyne | ................ | H01R 25/162 |
| | | | | 439/115 |
| 7,718,895 B2* | 5/2010 | Rodriguez | ............. | H02G 5/007 |
| | | | | 174/68.2 |
| 7,952,025 B2* | 5/2011 | Diaz | ........................ | H02B 1/21 |
| | | | | 174/68.2 |
| 7,952,875 B2 | 5/2011 | Woody et al. | | |
| 8,540,526 B2* | 9/2013 | Mooney | ................. | H02G 5/007 |
| | | | | 174/86 |
| 8,564,964 B2 | 10/2013 | Nakashima et al. | | |
| 8,859,897 B2 | 10/2014 | Hadi et al. | | |
| 8,900,002 B2* | 12/2014 | Mooney | ................... | H01R 4/60 |
| | | | | 439/212 |
| 9,006,571 B2* | 4/2015 | Manhart | ................. | H02B 1/21 |
| | | | | 174/129 B |
| 9,882,366 B2* | 1/2018 | Maurer | .................. | H02G 5/007 |
| 2006/0012934 A1* | 1/2006 | Faulkner | ............. | H01H 85/044 |
| | | | | 361/104 |

* cited by examiner

HIGH EFFICIENCY BUS BAR FOR USE IN CONDUCTING AN ALTERNATING CURRENT AND METHOD FOR MANUFACTURING SAME

TECHNICAL FIELD

The following relates to a bus bar for use in conducting an alternating current and a method for manufacturing such a bus bar.

BACKGROUND

An automotive vehicle powered fully or partially by an electric motor may be referred to as an electric vehicle (EV) or a hybrid electric vehicle (HEV). As is well known in the art, such vehicles include a high-voltage (HV) battery or batteries for supplying power to the electric motors thereof.

Such electric vehicles typically provide for charging HV batteries using a battery charger module mounted on-board the vehicle. The on-board battery charger module is provided in communication with the vehicle HV batteries and is configured to rectify AC electrical power from an electrical utility power grid for storage by the vehicle HV batteries. Such electric vehicles also include an inverter for use in converting DC voltage provided by the vehicle batteries to an AC voltage for use in powering the electric motor or motors of the vehicle. In addition, such electric vehicles may also include an auxiliary power module. These devices and modules may comprise a number of electrical components, which may include transformers, inductors, capacitors, bus bars, transistors and other components.

In a bus bar for conducting an alternating current, the AC current tends to concentrate closer to the surface of the bus bar. That is, the current density is higher towards the outer surfaces of the bus bar and lower towards the center of the bus bar. As a result, the solid cross section of an electrical conductor is only partially used when AC power is transferred through. This causes effective resistance of the bus to increase. The increase in AC resistance is more pronounced when the frequency of the AC current increases. Therefore, while this effect is experienced in 60 Hz AC utility systems, it is not substantial. However, traction inverters operating at around 1000 Hz markedly experience this effect, and wireless charging systems operating at around 85 kHz have a several fold increase in AC resistance. Increase in AC resistance causes increased power losses in the AC bus bar and hence increased temperature.

Thus, there exists a need for an improved bus bar for use in conducting an alternating current that would address the above noted issues. Such a bus bar would comprise multiple strips of electrical conductors. The thickness may be chosen based on the AC frequency and the width and number of strips may be chosen based on the total required current carrying capability. The thin strips reduce the AC resistance and gaps between the strips allow air flow to take place. Thus losses are reduced and temperature is lowered both by reduced losses and by improved convective air flow and thermal radiation.

Such a bus bar that has slots forming a ribbed structure, rather than a solid cross section, improves bus bar efficiency by lowering losses and reducing operating temperature. Such a bus bar is also lighter in weight and more compact in size than solid cross section bus bars. Such a bus bar also provides a level of efficiency for a wireless charger closer to that of an on-board charger.

SUMMARY

According to one of the embodiments described herein, a bus bar is provided for use in conducting an alternating current. The bus bar may comprise a plurality of substantially parallel ribs, each rib having a first and second end, each rib for conducting a substantially equal portion of the current, the ribs spaced apart to provide gaps therebetween for airflow through the gaps between the ribs. The bus bar may further comprise an electrically conductive attachment feature connecting the first ends of the plurality of ribs, the attachment feature for attaching the plurality of ribs to an electrical component. The bus bar may further comprise an electrically insulating spacer located between at least two of the plurality of ribs, the electrically insulating spacer contacting each of the at least two of the plurality of ribs and providing physical support between the at least two of the plurality of ribs.

According to another embodiment described herein, a bus bar for use in conducting an alternating current is provided. The bus bar may comprise a plurality of ribs, each rib having a first and second end, the ribs spaced apart to provide gaps therebetween for airflow through the gaps between the ribs, an electrically conductive first attachment feature connecting the first ends of the plurality of ribs, the first attachment feature for attaching the plurality of ribs to a first electrical component, and an electrically conductive second attachment feature connecting the second ends of the plurality of ribs, the second attachment feature for attaching the plurality of ribs to a second electrical component. The bus bar may further comprise an electrically insulating spacer located between at least two of the plurality of ribs and between the first and second ends of the at least two of the plurality of ribs, the electrically insulting spacer contacting each of the at least two of the plurality of ribs and providing physical support between the at least two of the plurality of ribs.

According to yet another embodiment described herein, a method for manufacturing a bus bar for use in conducting an alternating current is provided. The method may comprise attaching a plurality of electrically conductive strips to form a bus bar having a plurality of ribs, each rib having a first and second end, the ribs spaced apart to provide gaps therebetween for airflow through the gaps between the ribs, the first ends of the plurality of ribs connected together. The method may further comprise forming an attachment feature for attaching the plurality of ribs to an electrical component.

A detailed description of these and other embodiments of a busbar for use in conducting an alternating current is set forth below together with the accompanying drawings.

DETAILED DESCRIPTION

As required, detailed embodiments are disclosed herein. However, it is to be understood that the disclosed embodiments are merely exemplary and may take various and alternative forms. The figures are not necessarily to scale. Features may be exaggerated or minimized to show details of particular components. Therefore, specific structural and functional details disclosed herein are not to be interpreted as limiting, but merely as a representative basis for teaching one skilled in the art.

With reference to FIGS. 1-7, a more detailed description of various embodiments of a bus bar for use in conducting an alternating current and a method for manufacturing such a bus bar will be described. For ease of illustration and to facilitate understanding, like reference numerals have been used herein for like components and features throughout the drawings.

As previously described, electric vehicles (EV) and hybrid electric vehicles (HEV) typically provide for charging HV batteries using a battery charger module mounted on-board the vehicle. The on-board battery charger module is provided in communication with the vehicle HV batteries and is configured to rectify AC electrical power from an electrical utility power grid for storage by the vehicle HV batteries. Such electric vehicles also include an inverter for use in converting DC voltage provided by the vehicle batteries to an AC voltage for use in powering the electric motor or motors of the vehicle. In addition, such electric vehicles may also include an auxiliary power module. These devices and modules may comprise a number of electrical components, which may include transformers, inductors, capacitors, bus bars, transistors and other components.

In a bus bar conducting AC, the current tends to concentrate close to the surface of the bus bar (this effect is known in the industry as "skin effect"). As a result, the solid cross-section area of an electrical conductor, such as copper or aluminum, is only partially used when AC power passes through. This causes effective resistance of the bus bar to increase. The increase in AC resistance in more pronounced when the frequency of the AC current increases. Therefore, while this effect is experienced in 50 or 60 Hz AC utility systems, it is not substantial. However, traction inverters operating at 1000 Hz markedly experience this effect, and wireless charging systems operating at 85 kHz have several fold increase in AC resistance. Increase in AC resistance causes increased power losses in the AC bus bar and hence increased temperature.

Thus, there exists a need for an improved bus bar for use in conducting an alternating current that would address the above noted issues. Such a bus bar would comprise multiple strips of electrical conductors. The thickness may be chosen based on the AC frequency and the width and number of strips may be chosen based on the total required current carrying capability. The thin strips reduce the AC resistance and gaps between the strips allow air flow to take place. Thus, losses are reduced and temperature is lowered both by reduced losses, and by improved convective air flow and improved thermal radiation because of increased surface area available for the bus bar to exchange thermal radiation with the surroundings.

Referring now to FIGS. 1-4, perspective, front, bottom and side views are shown of a bus bar 10 for use in conducting an alternating current according to one embodiment of the present disclosure. As seen therein, the bus bar 10 may comprise a plurality of substantially parallel ribs 12, each rib 12 having a first end 14 and a second end 16. Each rib 12 may be provided for conducting a substantially equal portion of an alternating current. The ribs 12 may be spaced apart to provide gaps 18 therebetween for airflow through the gaps 18 between the ribs 12.

As seen in FIGS. 1-4, the plurality of ribs 12 may extend in a plurality of non-parallel planes. In that regard, the bus bar 10 may be essentially one-dimensional, with a plurality of straight ribs 12 (see, e.g., FIG. 5). However, the bus bar 10 may also be two dimensional or three-dimensional, depending upon the requirements of any particular application and the shape of the bus bar 10 needed to connect electrical components.

Still referring to FIGS. 1-4, an electrically conductive attachment feature 20 may be provided for connecting the first ends 14 of the plurality of ribs 12. Similarly, an electrically conductive attachment feature 22 may be provided for connecting the second ends 16 of the plurality of ribs 12. The attachment features 20, 22 may also be provided for attaching the plurality of ribs 12 to an electrical component (not shown).

As seen in FIGS. 1-4, the ends 14, 16 of the ribs 12 attached to features 20, 22 allow the ribbed bus bar 10 to be attached to an electrical system (not shown) that provides and uses electrical power. Features 20, 22 may include provisions for a bolted joint or connection point 24 (such as a through hole) and/or an electrical terminal of suitable design, such as a male blade terminal 26. Each of the attachment features 20, 22 thus comprises a terminal configured to cooperate with a terminal of an electrical component (not shown).

As is well known in the art, DC current is distributed substantially uniformly in a solid conductor. Conversely, AC current passing through a solid conductor is not uniformly distributed across the cross section of the conductor. Instead, the AC current density is highest at the surface of the conductor and decreases at points deeper into the solid conductor (away from surface). The depth at which the AC current density drops down to 36.79% of the value at or close to the surface may be referred to as the "skin depth" of the conductor, which is also dependent on the frequency of the AC current and the particular material of the conductor.

In that regard, at high frequency, AC current concentrates at the surface of a conductor, thereby decreasing conductor efficiency. Thus, a bus bar 10 having a structure with multiple strips or ribs 12 can increase conductor efficiency for AC current by providing greater surface area. Increased efficiency in such a bus bar 10 also results in lower losses and hence cooler operating temperatures. The plurality of ribs 12 of the bus bar 10 therefore provide for increasing efficiency of the bus bar 10 as the frequency of the alternating current increases. While such benefits are more pronounced at high frequency AC, those benefits can be obtained even at lower frequencies such as standard utility frequencies of 50 or 60 Hz.

Figure 1:
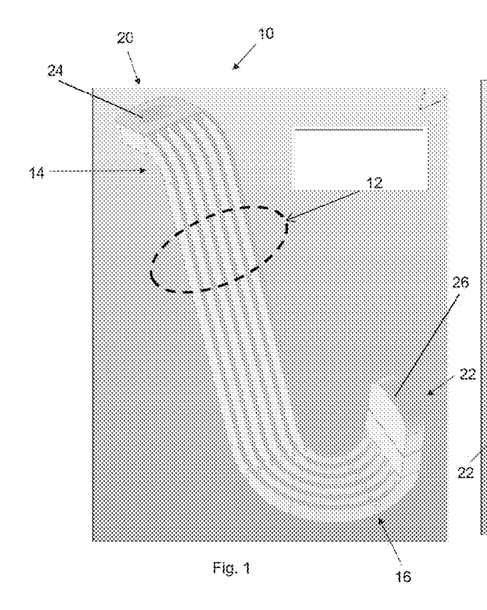
FIG. 1 is a perspective view of bus bar for use in conducting an alternating current according to an exemplary embodiment of the present disclosure.
Figure 2:
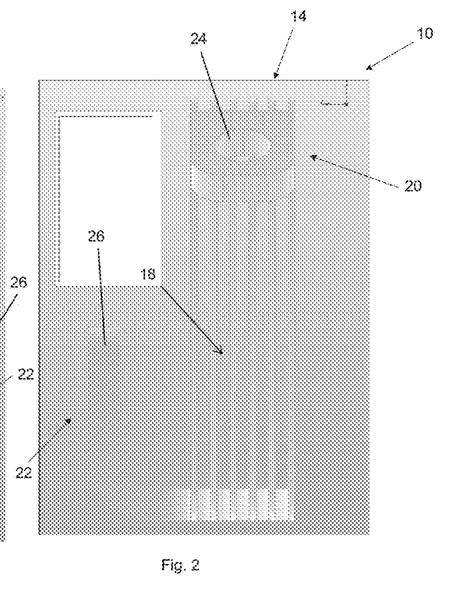
FIG. 2 is a front view of the bus bar of FIG. 1 for use in conducting an alternating current according to an exemplary embodiment of the present disclosure.
Figure 3:
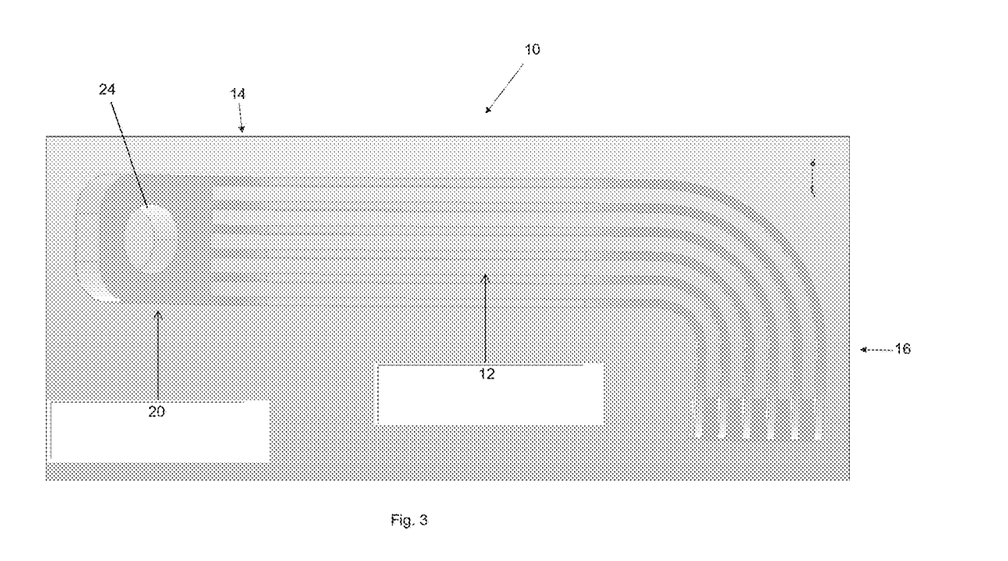
FIG. 3 is a bottom view of the bus bar of FIG. 1 for use in conducting an alternating current according to an exemplary embodiment of the present disclosure.
Figure 4:
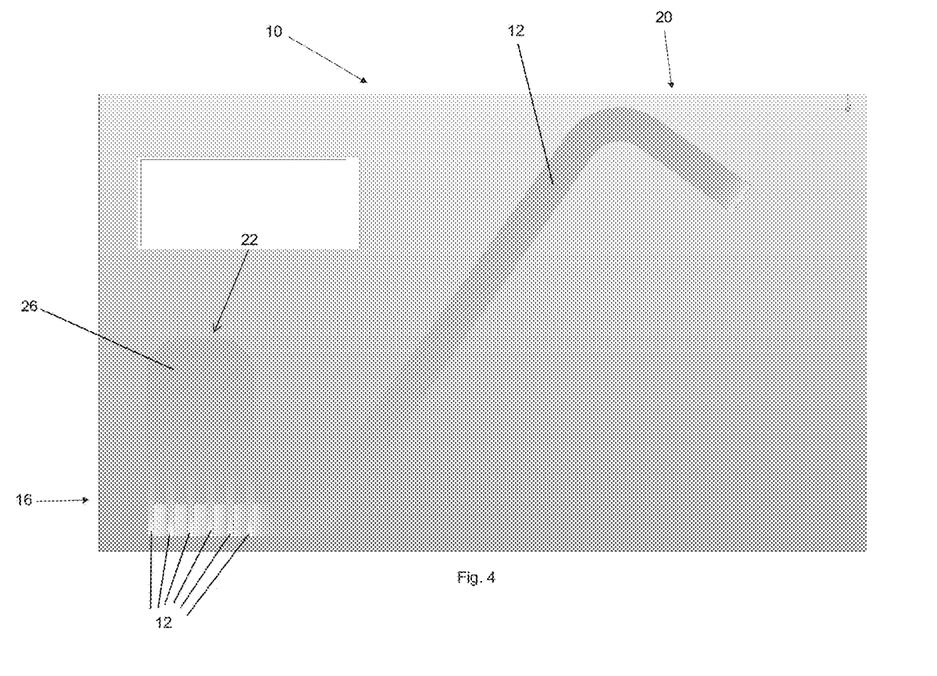
FIG. 4 is a side view of the bus bar of FIG. 1 for use in conducting an alternating current according to an exemplary embodiment of the present disclosure.
Figure 5:
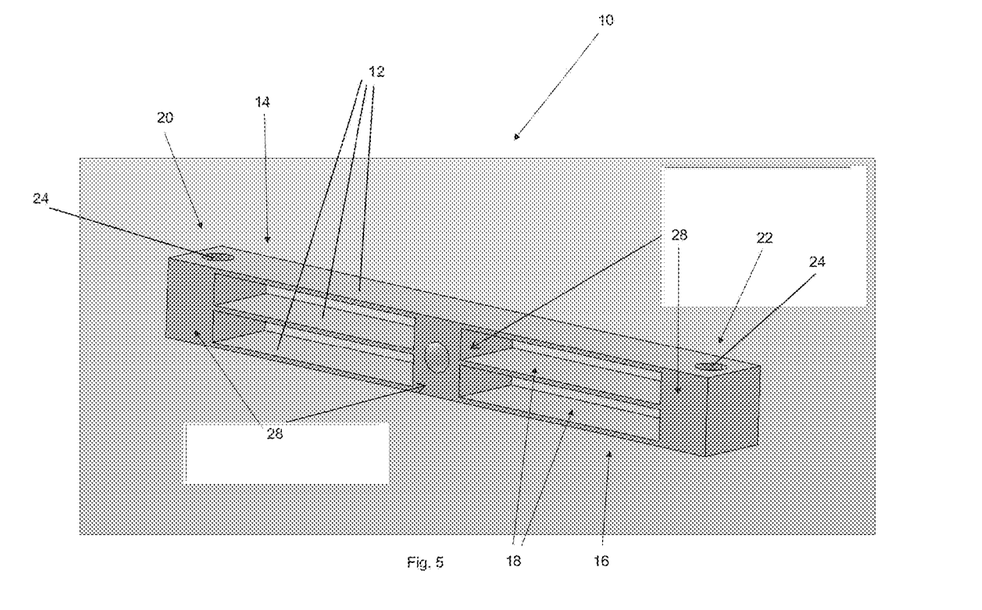
FIG. 5 is a perspective view of a bus bar for use in conducting an alternating current according to another exemplary embodiment of the present disclosure.

Referring next to FIG. 5, a perspective view is shown of a bus bar 10 for use in conducting an alternating current according to another embodiment of the present disclosure.

As seen therein, the bus bar 10 may comprise a plurality of ribs 12, each rib having a first end 14 and second end 16. The ribs 12 may be spaced apart to provide gaps 18 therebetween for airflow through the gaps 18 between the ribs 12. The plurality of ribs 12 provide increased efficiency of the bus bar 10 based on a frequency of the alternating current to be conducted by the bus bar 10.

The bus bar 10 may also comprise an electrically conductive first attachment feature 20 connecting the first ends 14 of the plurality of ribs 12. The first attachment feature 20 may be provided for attaching the plurality of ribs 12 to a first electrical component (not shown). The bus bar 10 may further comprise an electrically conductive second attachment feature 22 connecting the second ends 16 of the plurality of ribs 12. The second attachment feature 22 may be provided for attaching the plurality of ribs 12 to a second electrical component (not shown).

In that regard, the first attachment feature 20 of the bus bar 10 may comprise a terminal 24 configured to cooperate with a terminal of a first electrical component (not shown). The second attachment feature 22 of the bus bar 10 may likewise comprise a terminal 24 configured to cooperate with a terminal of a second electrical component (not shown). As previously noted, the terminals 24 may be configured for a bolted joint or connection point, such as a through hole or any other electrical terminal of suitable design.

Still referring to FIG. 5, the bus bar 10 may further comprise one or more spacers 28 located between at least two of the plurality of ribs 12 to provide support thereto and/or maintain spacing between the ribs 12. In that regard, a spacer 28 may comprise an insulating material, such as plastic. For long bus bars, a second function of the spacer(s) 28 is to avoid sagging of strips due to self-weight and maintain constant spacing between adjacent strips. In addition, when a bus bars 10 is deployed in a vibratory environment (such as an automotive vehicle), the spacers 28 improve the stiffness of the bus bar 10 and prevent oscillatory motion of individual strips 12 from becoming excessive and damaging. For these two functions, the spacer 28 can be made of engineering polymers that are not necessarily electrically conductive.

Alternatively, a spacer 28 may comprise an electrically conductive material, and may be configured as an electrical connection feature. Such a connection feature, which may comprise a through hole formed in the spacer 28 as shown in FIG. 5, can function as a connection point to tap off electrical power.

With reference to FIGS. 1-5, the plurality of ribs 12 of the bus bar 10 may comprise a plurality of stamped conductive strips, such as copper. Alternatively, the bus bar 10 may be made from other less commonly used materials such as other metals and/or electrically conductive polymers. Such strips may be welded or brazed together at the first and second ends 14, 16 of the ribs 12, such as by welding or brazing the strips to spacers 28. However, welding or brazing methods are exemplary only, and the plurality of ribs 12 may be attached at the first and/or second ends 14, 16 in any known fashion, such as riveting.

Figure 6:
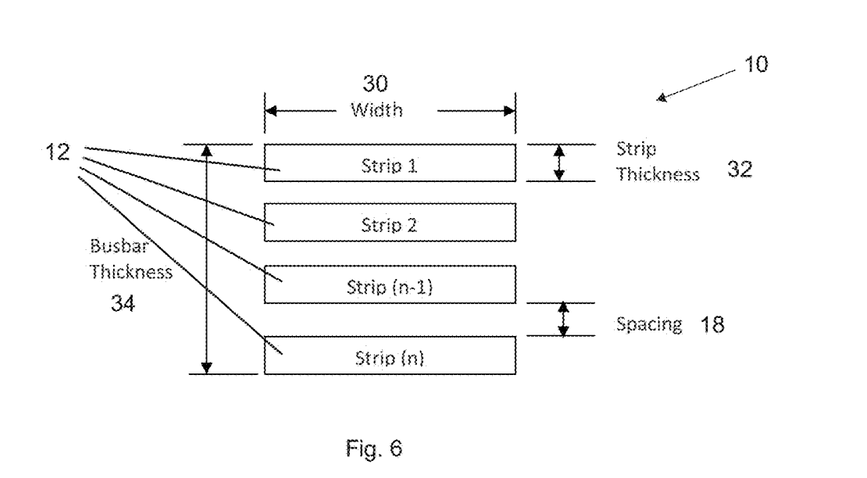
FIG. 6 is a cross-sectional view of a bus bar for use in conducting an alternating current according to a further exemplary embodiment of the present disclosure.

Referring next to FIG. 6, a cross-sectional view is shown of a bus bar 10 for use in conducting an alternating current according to one embodiment of the present disclosure. In that regard, the cross-sectional view shown may be associated with a bus bar 10 such as those depicted in FIGS. 1-5.

As seen therein, the structure of the bus bar 10 is that of thin ribs or strips 12, each having a substantially rectangular cross section. In that regard, the terms "rib" and "strip" may be used interchangeably herein. The strips 12 may be of any number (n), illustrated in FIG. 6 as strip numbers 1, 2, . . . , (n–1), n. The ribs or strips 12 each have a width 30 and a thickness 32, and together form a stack that defines a thickness 34 of the bus bar 10. In general the width 30 of each strip 12 is substantially larger than the thickness 32 of the strip 12. The ratio of the width 30 of the strips 12 to the thickness 34 of the bus bar 10 is application dependent and may also be driven by manufacturing feasibility. The ribs or strips 12 are also positioned a small distance apart from each other forming multiple air gaps 18.

Even though the strips 12 shown in FIG. 6 are of identical cross-section and spacing, these conditions are not necessary to provide the benefits described herein. That is, the strips 12 in the stack can be of different thicknesses and different spacing. This may be desirable in some cases because the outer strips 12 may be better cooled compared to the strips 12 closer to the center of the stack. Moreover, each strip 12 need not have the same length as other strips 12. Instead, the length of any strip 12 may be different than other strips 12. Still further, the width 30 and/or thickness 32 of any strip 12 may vary along the length of the bus bar 10.

The thickness 32 of each strip 12 in a bus bar 10 is a design variable. The thickness 32 of each strip 12 is primarily selected based on the previously described "skin depth" characteristic of the conductive material of the strip 12 and the frequency of the AC current to be conducted through the bus bar 10. For a given AC frequency, a smaller thickness 32 for each strip 12 generally offers better material utilization efficiency. In that regard, smaller values of strip thickness 32 result in lower AC resistance.

The spacing or gaps 18 between adjacent strips 12 in a bus bar 10 is another design variable. Increasing the spacing 18 improves cooling of the bus bar 10, and hence its efficiency, but also increases the overall cross sectional area of the bus bar 10 (i.e., bus bar thickness 34). The choice of spacing 18 between strips 12 is based on engineering design and optimization.

The width 30 of the strips 12 and the number of strips 12 in a bus bar 10 assembly is primarily a function of the current carrying capacity and the desired aspect ratio of the bus bar 10. For maintaining the AC capacity of a bus bar 10, it is possible to reduce the width 30 of the strips 12 by increasing the number (n) of strips 12 in the stack, and hence the thickness 34 of the bus bar 10. Conversely, the number (n) of strips 12 in the stack, and hence the thickness 34 of the bus bar 10, can be reduced by increasing the width 30 of the strips 12. The exact choice of the width 30 of the strips 12 and the thickness 34 of the bus bar 10 stack, as well as the shape of the bus bar 10 may be determined empirically for each design.

It should also be noted that the dimensions for a bus bar 10 are application and design dependent. In that regard, with reference to FIGS. 5 and 6, exemplary dimensions for a bus bar 10 carrying an AC current of 25 to 30 amperes at around 85 kHz are: three ribs or strips 12; each rib or strip 12 having a thickness 32 of 0.6 to 1.0 mm; each rib or strip 12 having a width 30 of 8 to 12 mm; and the bus bar 10 having a thickness 34 of 8 to 12 mm.

Figure 7:
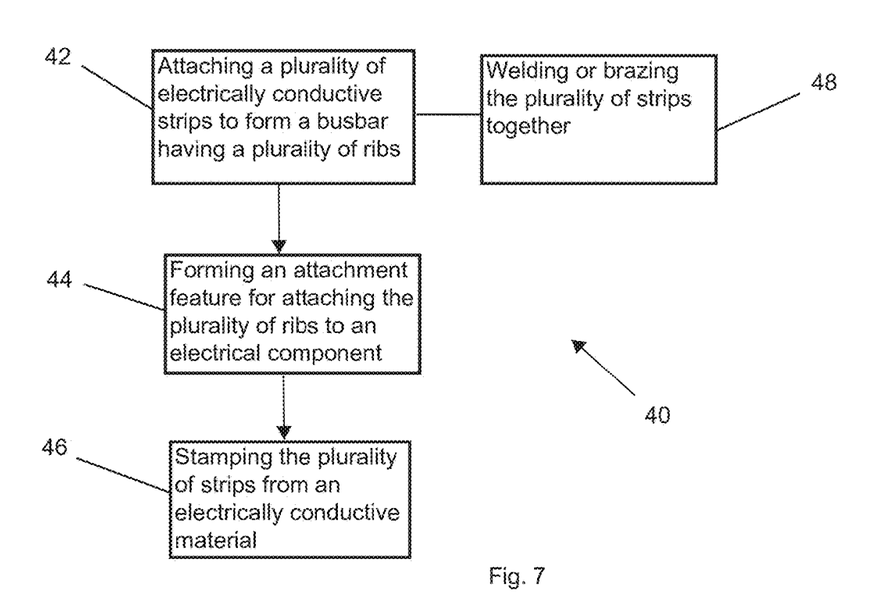
FIG. 7 is an exemplary flowchart of a method for manufacturing a bus bar for use in conducting an alternating current according to an exemplary embodiment of the present disclosure.

Referring now to FIG. 7, an exemplary flowchart of a method 40 for manufacturing a bus bar for use in conducting an alternating current according to an exemplary embodiment of the present disclosure. As seen therein, the method 40 may comprise attaching 42 a plurality of electrically conductive strips to form a bus bar having a plurality of ribs, each rib having a first and second end, the ribs spaced apart to provide gaps therebetween for airflow through the gaps between the ribs, the first ends of the plurality of ribs connected together. The method 40 may further comprise forming 44 an attachment feature for attaching the plurality of ribs to an electrical component.

The method 40 may also comprise stamping 46 the plurality of electrically conductive strips from an electrically conductive material, each strip having a substantially similar form. Moreover, according to the method 40, attaching 42 the plurality of electrically conductive strips may comprise welding or brazing 48 the plurality of strips together.

In that regard, it should be noted that the benefits provided by the bus bar 10 described herein are not limited by a specified manufacturing method. Even though welding and brazing manufacturing processes may be more feasible for smaller sized bus bars 10, in some instances riveting the strips 12 together may be a more feasible and less costly method of construction. For larger bus bars 10, casting and subsequent machining may be an optimal manufacturing method. As well, 3D printing may alternatively be an optimal manufacturing process. Regardless, as previously noted, the benefits associated with the various embodiment of a bus bar 10 described herein are not affected by or dependent upon the manufacturing process utilized. The manufacturing process selected may depend on the size, dimensions, accuracy and number of items to be produced.

As is readily apparent from the foregoing, embodiments of a bus bar for use in conducting an alternating current and a method for manufacturing such a bus bar have been described. Such embodiments provide a bus bar that is not of a solid cross section, but has slots forming a ribbed structure, thereby improving bus bar efficiency by lowering losses and reducing operating temperature, and providing a bus bar that is lighter in weight and more compact in size than solid cross sectional bus bars.

While various embodiments of a bus bar for use in conducting an alternating current and a method for manufacturing such a bus bar have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A bus bar for use in conducting an alternating current, the bus bar comprising:
    a plurality of substantially parallel ribs, each rib having a first and second end, each rib for conducting a substantially equal portion of the current, the ribs spaced apart to provide gaps therebetween for airflow through the gaps between the ribs;
    an electrically conductive attachment feature electrically connecting the first ends of the plurality of ribs, the attachment feature for attaching the plurality of ribs to an electrical component; and
    an electrically insulating spacer located between at least two of the plurality of ribs, the electrically insulating spacer contacting each of the at least two of the plurality of ribs and providing physical support between the at least two of the plurality of ribs.

2. The bus bar of claim 1 wherein the plurality of ribs extends in a plurality of non-parallel planes.

3. The bus bar of claim 1 wherein each of the plurality of ribs has a substantially rectangular cross-section.

4. The bus bar of claim 1 wherein the plurality of ribs comprises a plurality of stamped conductive strips welded or brazed together.

5. The bus bar of claim 1 wherein each of the plurality of ribs has a width substantially larger than a thickness.

6. The bus bar of claim 1 wherein the attachment feature comprises a terminal configured to cooperate with a terminal of the electrical component.

7. The bus bar of claim 1 wherein the plurality of ribs provides increased bus bar efficiency as a frequency of the alternating current increases.

8. The bus bar of claim 1 further comprising an electrically conductive spacer located between at least two of the plurality of ribs, the spacer comprising an electrical connection feature.

9. A bus bar for use in conducting an alternating current, the bus bar comprising:
    a plurality of ribs, each rib having a first and second end, the ribs spaced apart to provide gaps therebetween for airflow through the gaps between the ribs; and
    an electrically conductive first attachment feature electrically connecting the first ends of the plurality of ribs, the first attachment feature for attaching the plurality of ribs to a first electrical component;
    an electrically conductive second attachment feature connecting the second ends of the plurality of ribs, the second attachment feature for attaching the plurality of ribs to a second electrical component; and
    an electrically insulating spacer located between at least two of the plurality of ribs and between the first and second ends of the at least two of the plurality of ribs, the electrically insulating spacer contacting each of the at least two of the plurality of ribs and providing physical support between the at least two of the plurality of ribs.

10. The bus bar of claim 9 wherein the plurality of ribs extends in a plurality of non-parallel planes.

11. The bus bar of claim 9 wherein the plurality of ribs comprises a plurality of stamped conductive strips welded or brazed together.

12. The bus bar of claim 9 wherein each of the plurality of ribs has a width substantially larger than a thickness.

13. The bus bar of claim 9 wherein the first attachment feature comprises a terminal configured to cooperate with a terminal of the first electrical component and the second attachment feature comprises a terminal configured to cooperate with a terminal of the second electrical component.

14. The bus bar of claim 9 further comprising an electrically conductive spacer located between at least two of the plurality of ribs, the spacer comprising an electrical connection feature.

15. The bus bar of claim 9 wherein the plurality of ribs provides increased bus bar efficiency as a frequency of the alternating current increases.

* * * * *

UNITED STATES PATENT AND TRADEMARK OFFICE
CERTIFICATE OF CORRECTION

PATENT NO. : 10,269,466 B2
APPLICATION NO. : 15/156456
DATED : April 23, 2019
INVENTOR(S) : Ajmal Imran Ansari It is certified that error appears in the above-identified patent and that said Letters Patent is hereby corrected as shown below:

On the Title Page

Delete the title page and substitute therefore with the attached title page consisting of the corrected illustrative figure.

Under abstract "15 Claims, 5 Drawing Sheets" should read --15 Claims, 3 Drawing Sheets--.

In the Drawings

Please replace FIGS. 1-7 with FIGS. 1-7 as shown on the attached pages.

Signed and Sealed this
Thirty-first Day of March, 2020

Andrei Iancu
*Director of the United States Patent and Trademark Office*

(12) United States Patent
Ansari (10) Patent No.: US 10,269,466 B2
(45) Date of Patent: Apr. 23, 2019

(54) HIGH EFFICIENCY BUS BAR FOR USE IN CONDUCTING AN ALTERNATING CURRENT AND METHOD FOR MANUFACTURING SAME

(71) Applicant: Lear Corporation, Southfield, MI (US)

(72) Inventor: Ajmal Imran Ansari, Canton, MI (US)

(73) Assignee: Lear Corporation, Southfield, MI (US)

(*) Notice: Subject to any disclaimer, the term of this patent is extended or adjusted under 35 U.S.C. 154(b) by 182 days.

(21) Appl. No.: 15/156,456

(22) Filed: May 17, 2016

(65) Prior Publication Data
US 2017/0338002 A1 Nov. 23, 2017

(51) Int. Cl.
| | |
|---|---|
| *H01B 5/02* | (2006.01) |
| *H02B 1/20* | (2006.01) |
| *B60L 11/00* | (2006.01) |
| *H01M 2/20* | (2006.01) |
| *H01R 13/02* | (2006.01) |
| *H01B 13/00* | (2006.01) |
| *H01R 43/16* | (2006.01) |
| *H02G 5/10* | (2006.01) |
| *H01R 11/28* | (2006.01) |

(52) U.S. Cl.
CPC ............ *H01B 5/02* (2013.01); *B60L 11/00* (2013.01); *H01B 13/0036* (2013.01); *H01M 2/206* (2013.01); *H01R 13/02* (2013.01); *H01R 43/16* (2013.01); *H02B 1/20* (2013.01); *H02G 5/10* (2013.01); *H01R 11/288* (2013.01)

(58) Field of Classification Search
None
See application file for complete search history.

(56) References Cited

U.S. PATENT DOCUMENTS

| | | | | |
|---|---|---|---|---|
| 2,297,170 | A | * | 9/1942 | Rudd ............... H02G 5/02 174/99 B |
| 2,997,627 | A | * | 8/1961 | Ellegood ........... H02B 1/21 174/88 B |
| 3,213,183 | A | * | 10/1965 | Weimer ............ H02G 5/06 174/33 |
| 5,393,934 | A | | 2/1995 | Mori et al. |
| 5,821,464 | A | * | 10/1998 | Graham ............ H02G 5/007 174/86 |
| 6,024,589 | A | * | 2/2000 | Hahn, IV ......... H05K 1/148 174/71 B |
| 6,244,876 | B1 | | 6/2001 | Saka |
| 6,506,068 | B2 | * | 1/2003 | Wagener ........... H02G 5/00 174/88 B |
| 7,198,524 | B2 | | 4/2007 | Tsugane et al. |

(Continued)

*Primary Examiner* — Dimary S Lopez Cruz
(74) *Attorney, Agent, or Firm* — Brooks Kushman P.C.

(57) ABSTRACT

A bus bar for use in conducting an alternating current may comprise multiple substantially parallel ribs and an electrically conductive attachment feature. Each rib may include a first and second end. Each rib may be provided for conducting a substantially equal portion of the current. The ribs may be spaced apart to provide gaps therebetween for airflow through the gaps. The electrically conductive attachment feature may connect the first ends of the plurality of ribs, and may be provided for attaching the plurality of ribs to an electrical component. An electrically insulating spacer may be located between at least two of the ribs, contacting and providing physical support to those ribs.

15 Claims, 5 Drawing Sheets